United States Patent [19]

Rezvykh et al.

[11] 4,326,141

[45] Apr. 20, 1982

[54] SUPPORTING INSULATING COLUMN OF HIGH VOLTAGE ACCELERATOR

[76] Inventors: Konstantin A. Rezvykh; Valentin A. Romanv, both of ploschad Bondarenko, 1, Obninsk, U.S.S.R.

[21] Appl. No.: 211,108

[22] Filed: Nov. 28, 1980

[51] Int. Cl.$^3$ .............................................. H02K 0/00

[52] U.S. Cl. .................................... 310/308; 310/309

[58] Field of Search ................................ 310/308–310

[56] References Cited

U.S. PATENT DOCUMENTS

| | | | |
|---|---|---|---|
| 2,230,473 | 2/1941 | Van de Graaf | 310/308 |
| 2,252,668 | 8/1941 | Trump | 310/308 |
| 2,847,586 | 8/1958 | Stiff | 310/308 |
| 2,847,611 | 8/1958 | Van de Graaf | 310/309 X |
| 3,071,702 | 1/1963 | Enge | 310/309 |
| 3,184,621 | 5/1965 | Christoffenson | 310/309 |
| 3,255,301 | 6/1966 | Christofferson | 310/308 X |
| 3,323,069 | 5/1967 | Van de Graaf | 310/309 X |
| 3,424,929 | 1/1969 | Christofferson | 310/309 X |
| 3,473,056 | 10/1969 | Ferry | 310/309 |
| 3,473,064 | 10/1969 | Herb | 310/309 X |

*Primary Examiner*—Donovan F. Duggan
*Attorney, Agent, or Firm*—Lilling & Greenspan

[57] ABSTRACT

A supporting insulating column of a high-voltage accelerator comprises sections whereto the operating potential is distributed. These sections form a high potential region adjoining the high-voltage terminal of the accelerator, a low potential region adjoining the grounded footing of the column and an intermediate region. The outer surface of the sections is composed of screening electrodes made as hoops having oval profiles in at least one of said regions, oriented so that one vertex of the oval is directed inside the column, whereas the other vertex of the oval is directed away from the column. The oval profile of at least some electrodes in at least one of said regions is produced by joining the components of at least two ovals.

1 Claim, 10 Drawing Figures

SUPPORTING INSULATING COLUMN OF HIGH VOLTAGE ACCELERATOR

FIELD OF THE INVENTION

This invention relates to high-voltage accelerators and, in particular, to supporting insulating columns of high-voltage accelerators, which carry the high-voltage terminal of accelerators above the grounded footing of the column. The supporting column and the high-voltage terminal are usually placed inside a grounded electrode made as a coaxial cylindrical tube filled with gaseous insulating high pressure mixture /referred to as insulating medium hereinafter/.

BACKGROUND ART

Known in the art is a supporting insulating column of a high-voltage accelerator, comprising sections whereto the operational potential is distributed, forming a high-potential region adjoining the high-voltage terminal of the accelerator, a low potential region thereof adjoining the grounded footing of the column and an intermediate region. The exterior surface of sections is made up of screening electrodes made as hoops with a round profile (cf., for example, U.S. Pat. No. 3,424,929 Cl. 310-5, 1969).

The round profile of electrodes results in that the electrical strength of the high potential end of the column is not high. The column is thus the weak place in the accelerator insulation and becomes the major consideration limiting the peak operating potential of the accelerator. The rupture of the column is actually the cause of the most troublesome overvoltages in the components of the accelerator whose reliability is thought of in these terms.

Also known in the art is a supporting insulating column of a high-voltage accelerator, comprising sections whereto the operational potential is distributed, forming a high potential region adjoining the high-voltage terminal of the accelerator, a low potential region adjoining the grounded footing of the column and an intermediate region, the exterior surface of said sections being composed of screening electrodes made as hoops with an oval profile oriented so that the major axis of the oval is parallel to the tangent to the exterior surface of the sections/cf., for example, Proceedings of the International Conference on the Technology of Electrostatic Accelerators, Daresbury, 1973, p. 91, 1971.

With such electrodes the increase in crosswise electrical strength is only from 10 to 15 percent and the reliability of the accelerator remains poor. The above described column uses insulating medium almost only in the high potential region, its use in other regions being insufficient.

There is also known a supporting insulating column of a high-voltage accelerator, comprising sections whereto the operating potential is distributed, forming a high potential region adjoining the high-voltage terminal of the accelerator, a low potential region adjoining the grounded footing of the column and an intermediate region, the exterior surface of said sections being composed of screening electrodes made as hoops having in at least one of the regions an oval profile oriented so that one oval vertex is facing inside the column, whereas the other vertex is directed away from the column, the major oval axis extending therethrough forms an angle with the tangent to the outside surface of sections, said angle being read from the high potential end of the column/cf., for example, Nuclear Instruments and Methods, 1980, v. 171, pp. 219–222/.

The crosswise electrical strength shows an only 10 percent increase with such electrodes. The column remains the weak link in the accelerator insulation, as compared to the high-voltage terminal. The accelerator reliability is thus hardly improved at all.

Besides, the electrical strength of the clearance between adjoining sections of this column, formed by the curved surfaces of electrodes, is not high and it becomes difficult to combine lateral and longitudinal electrical strength of the column.

Despite structural changes of electrodes in all above described columns the operational potential can be raised either by widening the gap between the column and the grounded electrode enveloping the column and the accelerator terminal or by providing additional screens in said gap/cf., for example, U.S. Pat. No. 2,230,473 Cl. 310-5, 1941/, which complicates the overall design and servicing of the accelerator, or by making use of another more expensive and stronger insulating medium.

BRIEF DESCRIPTION OF THE INVENTION

It is an object of the present invention to raise the electrical strength of a supporting insulating column of a high-voltage accelerator both lengthwise and crosswise and, consequently, improve the reliability of the high-voltage accelerator.

This is achieved in that in a supporting insulating column of a high-voltage accelerator, comprising sections whereto the operating potential is distributed, forming a high potential region adjoining the high-voltage terminal of the accelerator, a low potential region adjoining the grounded fotting of the column and an intermediate region, the exterior surface thereof being composed of screening electrodes made as hoops with an oval profile in at least one of said regions, oriented so that one vertex of the oval is directed inside the column, whereas the other vertex is directed away from the column and the major axis of the oval extending therethrough forms an angle with the tangent to the exterior surface of the sections, said angle being read from the high potential end of the column, according to the invention, the oval profile of at least some electrodes in at least one region of the column is produced by joining components of at least two ovals so that the angle read from the high-potential end of the column is obtained between the major axis of the oval of one component, extending through the vertex directed away from the column, and a tangent to the exterior surface of the sections, whereas an angle larger than the angle read from the high potential end of the column is produced between the extension of the major axis running through the vertex of the oval of the other component, direct inside the column, and the same tangent to the exterior surface of the section, said angle being also read from the high potential end of the column.

This design of a supporting insulating column of a high-voltage accelerator, according to the invention, permits combination of greater crosswise electrical strength of the column with greater lengthwise electrical strength of this column, as well as selective adjustment of both parameters.

The reliability of the accelerator is, consequently, improved and operating costs are reduced owing to less number of and shorter length of shutdowns for maintenance and repair of column components disabled by disruption of insulation.

In some accelerators a 20 to 40 percent increase in operating potential can be obtained only by changing the profile of column electrodes as compared to accelerators using round column electrodes. Moreover, the energy of accelerated particles can be substantially stepped up by providing previously unattainable operating conditions. The reliability of accelerators is consequently improved.

BRIEF DESCRIPTION OF DRAWINGS

The invention will now be described with reference to a specific embodiment thereof in conjunction with the accompanying drawings, wherein.

DETAILED DESCRIPTION OF THE INVENTION

Figure 1:
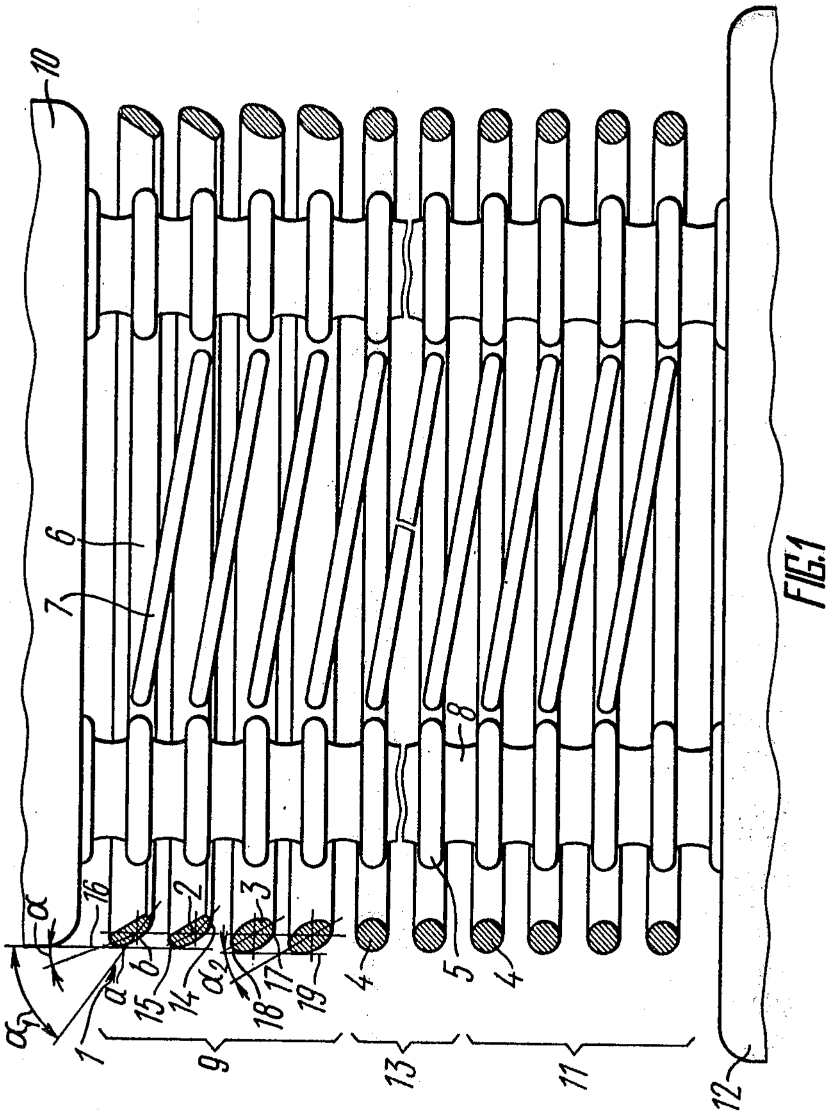
FIG. 1 shows a longitudinal section view of a supporting insulating column with some of screening electrodes having profiles composed of two ovals in the high potential region, according to the invention.

A supporting insulating column of a high-voltage accelerator, according to the invention, comprises a multitude of sections 1 (FIG. 1) whereto the operating potential is distributed. Each such section 1 has exterior screening electrodes 2,3 and 4 made as hoops secured on inside electrodes 5 secured on metal frame 6. Adjoining frames 6 carry resistors 7 of a voltage divider. Any type of voltage divider can be employed here. The sections 1 are separated by insulators 8.

Sections 1 form a high potential region 9 adjoining a high-voltage terminal 10 of the accelerator, a low potential region 11 adjoining a grounded footing 12 of the column and an intermediate region 13.

The outer surface of the column sections 1 is composed, according to the invention, of electrodes 2,3 and 4 made as hoops. The electrodes 2 and 3 of the sections 1 are within the high potential region 9, the electrodes 4 are within the region 13 and the low potential region 11 respectively.

The profile of the electrodes 2 is oval and is produced by joining components of two ovals a and b. The profile is oriented so that one vertex 14 of one oval b is directed inside the column, whereas the other vertex 15 of the other oval a is directed away from the column. The major axis of the oval a extending through the vertex 15 forms an angle $\alpha$ with a tangent 16 to the outer surface. The angle is read from the high potential end of the column. The extension of the major axis running through the vertex 14 of the oval b forms an angle $\alpha_1$ with the tangent 16, which is larger than the angle $\alpha$ and is read also from the high potential end of the column.

In this embodiment of the invention which is most suitable for obtaining the top reliability of the accelerator or the angle $\alpha$ is equal to 15° and the angle $\alpha_1$ is 25°.

The electrodes 3 of the sections 1 have an oval profile formed by one oval and oriented so that one vertex 17 of the oval is directed inside the column, whereas the other vertex 18 is directed away from the column. The major oval axis running therethrough forms an angle $\alpha_2$ with a tangent 19 to the outer surface of sections, which is read from the high potential end of the column. In this embodiment of the invention the angle $\alpha_2$ is 10°.

The electrodes 4 of the sections 1 have a round profile.

The above described embodiment of the column, according to the invention, has only some oval electrodes 2 in the high-potential region 9 made up of the components of two ovals a and b.

In another embodiment of a column, according to the invention, all electrodes 20 (FIG. 2) in the high potential region 9 have oval profiles produced by joining components of two ovals a and b. This embodiment is most suitable for improving the reliability of the accelerator.

Figure 2:
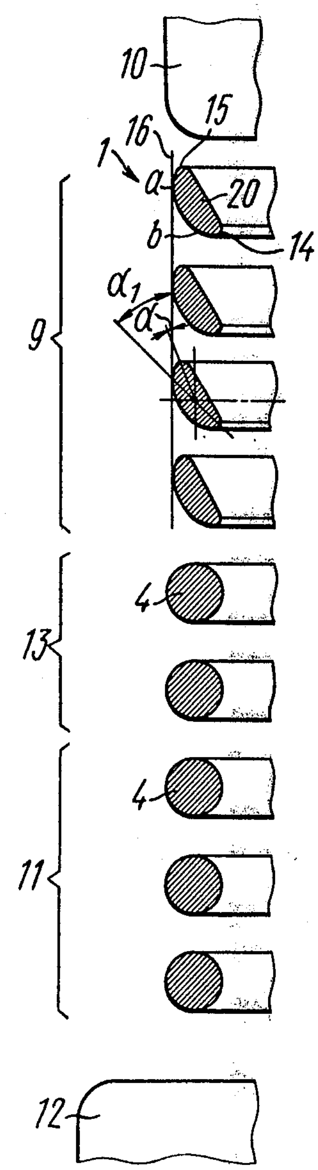
FIG. 2 shows schematically a longitudinal section view taken from one side of the column longitudinal axis of another embodiment of a column of FIG. 1, featuring screening electrodes whose profile in the high potential region is composed of two ovals.
Figure 3:
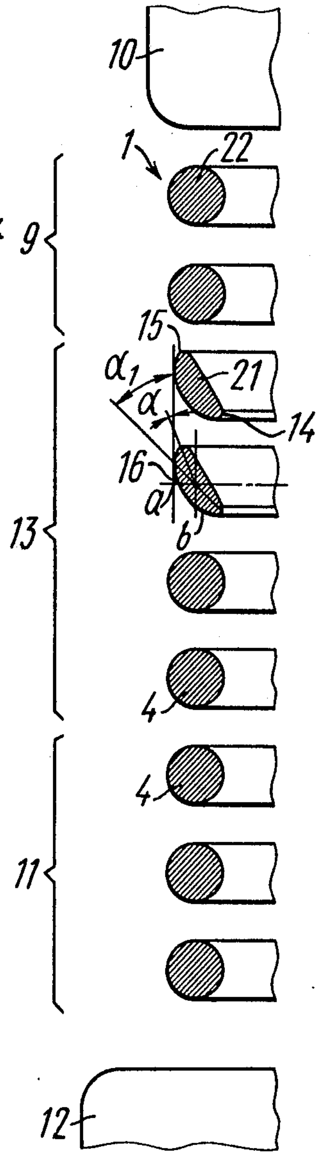
FIG. 3 shows a longitudinal section view taken from one side of the column longitudinal axis of an embodiment of a supporting column featuring screening electrodes whose profile in the region located between the high potential and low potential regions is composed of two ovals, according to the invention.

Referring to FIG. 3, an embodiment of a supporting insulating column has the oval profile of some electrodes 21 of the sections 1 in the region 13 produced by joining the components of two ovals a and b. This oval profile of the electrodes 21 formed by joining the two ovals a and b is oriented similar to that of the electrodes 2 (FIG. 1) and 20 (FIG. 2). Other electrodes 4 (FIG. 3) in the region 13, as well as electrodes 4 in the low potential region 11 and electrodes 22 in the high potential region 9 all have round profiles.

This embodiment of a supporting column, according to the invention, is suitable for obtaining high electrical crosswise strength of the column, when the diameter of the high-voltage terminal of the accelerator noticeably exceeds the outer diameter of the sections 1 of the column and the high potential region 9 is screened by the terminal 10.

Figure 4:
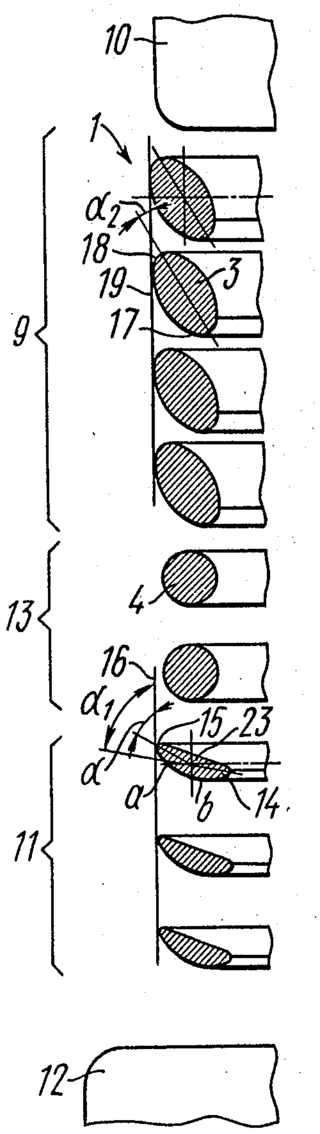
FIG. 4 shows a longitudinal section view taken from one side of the column longitudinal axis of another embodiment of a supporting column featuring screening electrodes whose profile in the low potential region is composed of two ovals, according to the invention.

The embodiment of a supporting column of FIG. 4 is used to obtain high electrical lengthwise strength of the supporting column and to reduce the length of said supporting column.

In this embodiment all electrodes 23 of the sections 1 of the low potential region 11 have oval profiles which are formed by joining the components of two ovals a and b. The oval cross-sectional profile of the electrodes 23 is oriented as described above, but the angle $\alpha$ in this case is equal to 60° and the angle $\alpha_1$ is 80°.

The electrodes 3 of the sections 1 of the high potential region 9 and the electrodes 4 of the sections 1 of the region 13 are made similar to the electrodes 3 and 4 of FIG. 1. The angle $\alpha_2$ in this case is equal to 10°. In the embodiment of a supporting column of FIG. 5 the electrodes 2 and 4 of the sections 1 of the high potential region 9 and of the intermediate region 13 are made similar to the column of FIG. 1.

The oval profile of electrodes 24 (FIG. 5) of the sections 1 of the low potential region 11 is formed by joining the components of three ovals c, d and e. This oval profile is oriented so that one vertex 25 of the oval e is directed inside the column, whereas another vertex 26 of the oval c is directed away from the column. The major axis of the oval c, extending through the vertex 26, forms with a tangent 27 to the outer surface an angle $\alpha_3$ read from the high potential end of the supporting column. The major axis of the oval d forms an angle with the tangent 27. The extension of the major axis of the oval e, running through the vertex 25, forms an angle $\alpha_5$ with the tangent 27.

In this embodiment the angle $\alpha_3$ is equal to 60°, the angle $\alpha_4$ is 80° and the angle $\alpha_5$ is 100°.

This embodiment can be used to obtain high electrical strength both crosswise and lengthwise, to improve reliability of the supporting column and to reduce the length thereof.

Figure 5:
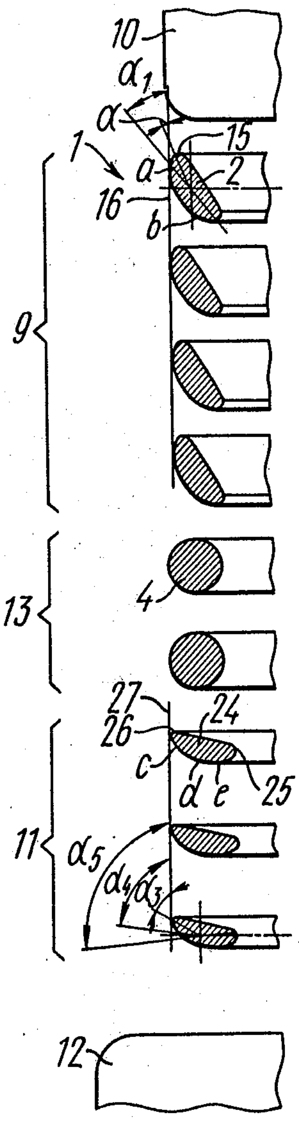
FIG. 5 shows a longitudinal section view taken from one side of the column longitudinal axis of one more embodiment of a supporting column featuring screening electrodes whose profile is composed of two ovals in the high potential region and of three ovals in the low potential region, according to the invention.
Figure 6:
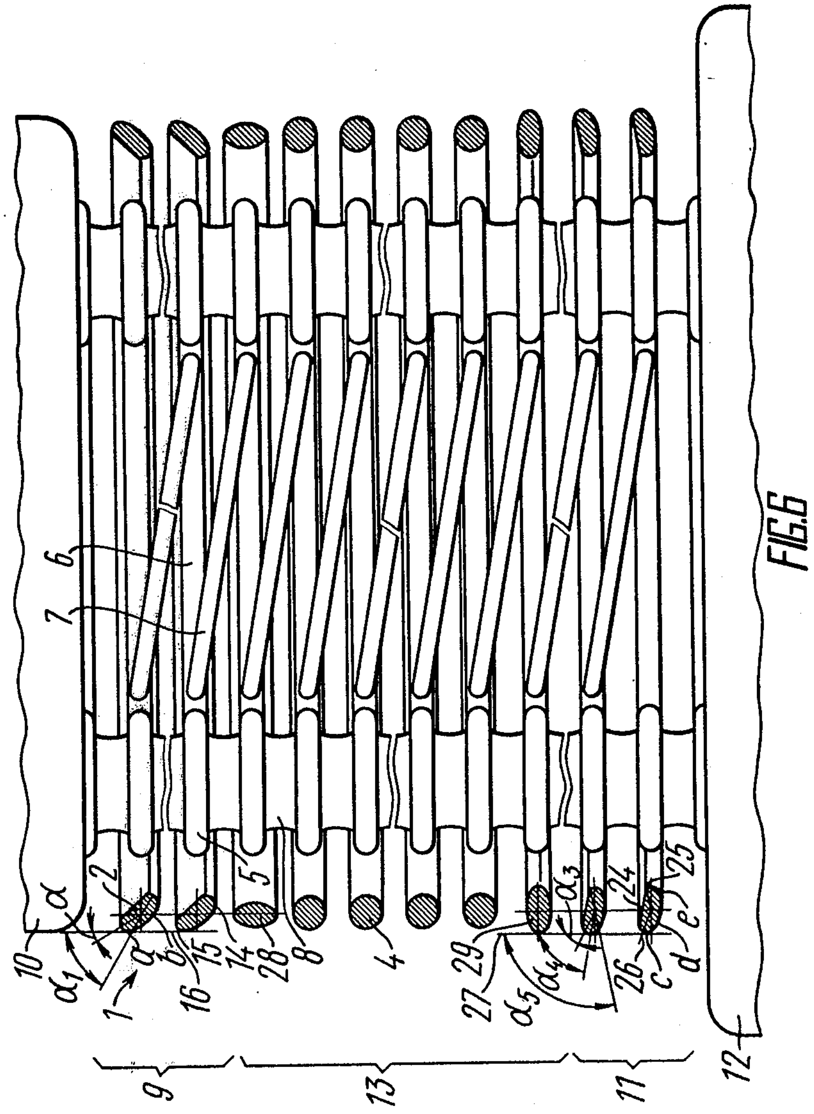
FIG. 6 shows a longitudinal section view of a supporting insulating column featuring screening electrodes whose profile is made up of two ovals in the high potential region and of three ovals in the low potential region and having screening electrodes adjoining the electrodes of said regions, whose profile is made up of one oval, according to the invention.

In the embodiment of FIG. 6 of a supporting column electrodes 2 of the sections 1 of the high potential region 9 and electrodes 24 of the sections 1 of the low potential region 11 are made similar to the electrodes of these regions of the column of FIG. 5.

The electrodes 4 (FIG. 6) of the sections 1 of the intermediate region 13 are made similar to the electrodes of this region of the column of FIG. 5 except for electrodes 28 (FIG. 6) and 29 adjoining one electrode 2 of the high potential region 9 and one electrode 24 of the low potential region 11, respectively.

Electrode 28 is also oval in profile which is composed of one oval whose major axis runs parallel to the tangent 16 to the outer surface of the sections 1.

Electrode 29 is oval in profile compound of one oval whose major axis runs perpendicular to the tangent 27 to the outer surface of the sections 1.

This embodiment of the supporting column can be used, according to the invention, to combine the high electrical crosswise and lengthwise strength of the electrodes 2 of the high potential region 9 and extremely high lengthwise electrical strength of the electrodes 24 in the low potential region 11 with the electrodes 4 having round profile in the intermediate region 13. Intermediate zones comprising electrodes 28 and 29 are intended to level off the field strength at junctions of the regions. In this manner a shorter high potential region 9 and a longer low potential region 11 can be provided (not shown in the drawing not to interfere with the essence of the invention).

Figure 7:
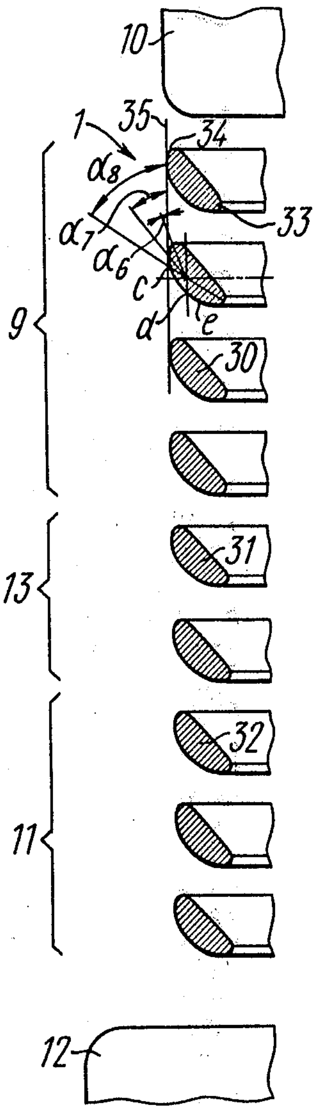
FIG. 7 shows schematically a longitudinal section view taken from one side of the column longitudinal axis of an embodiment of a supporting insulating column featuring screening electrodes whose profiles are composed of three ovals in all regions.

In the column of FIG. 7 the oval profile of all electrodes 30, 31 and 32 of the sections 1 in all regions 9, 13 and 11 is produced by joining components of three ovals c, d and e.

This oval profile is oriented so that one vertex 33 of the oval e is directed inside the column, whereas another vertex 34 of another oval c is directed away from the column. The major axis of the oval c, extending through the vertex 34 forms with a tangent 35 to the outer surface of sections 1 an angle $\alpha_6$ read from the high potential end of the supporting column. The major axis of the oval d forms with the tangent 35 an angle $\alpha_7$. The extension of the major axis of the oval e, running through the vertex 33, forms with the tangent 35 an angle $\alpha_8$.

In this embodiment of the supporting column the angle $\alpha_6$ is equal to 20°, the angle $\alpha_7$ is equal to 30° and the angle $\alpha_8$ is 40°.

This embodiment of a supporting column is used for accelerators wherein the exterior grounded electrode (not shown) surrounding the column and the high-voltage terminal forms a clearance with the external surface of the column, which decreases towards the column footing.

Figure 8:
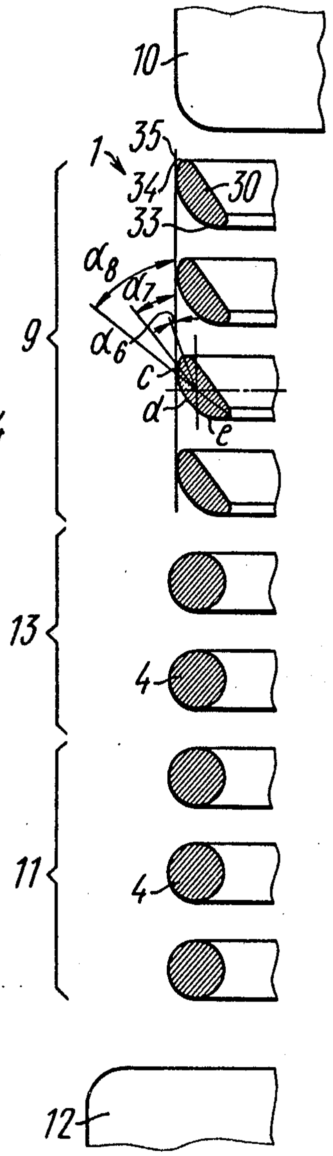
FIG. 8 shows a longitudinal section view taken from one side of the column longitudinal axis of another embodiment of a supporting insulating column featuring screening electrodes whose profiles are composed of three ovals in the high potential region.

In the embodiment of FIG. 8 of a supporting column electrodes 30 of sections 1 of the high potential region 9 are made similar to the electrodes of this region in the column of FIG. 7. The electrodes 4 of the intermediate region 13 and of the low potential region 11 are made similar to the electrodes in these regions of the column of FIG. 1.

The supporting column of FIG. 8 can be successfully used to provide high electrical crosswise and lengthwise strength and good reliability of the accelerator with minimum changes in the column design.

The supporting insulating column of a high-voltage accelerator, according to the invention, operates in the following way.

Operating potential is produced at the high-voltage terminal 10 (FIG. 1). The resistors 7 of the voltage divider distribute said potential among sections 1 of the column as specified. The electrodes 2, 3 and 4 shield internal components of the sections 1 from the external electrostatic field. Insulation of these electrodes should withstand both lateral and longitudinal voltage drop without ruptures.

The electrical strength of an accelerator is thought to be the higher the lower is the electrostatic field intensity at the high-voltage terminal 10 and electrodes 2 (at the maximum operating potential of the accelerator). Thus, for example, if in the accelerator column, where all electrodes of the high potential region have round profiles, the mean longitudinal gradient is 1.25 $Mv/m^{-1}$ and the potential of the high-voltage terminal is 2.5 Mv, the field intensity of the column electrodes reaches its maximum at the high potential end thereof and is equal to 16 $Mv/m^{-1}$, the maximum intensity at the high-voltage terminal being 13 $Mv/m^{-1}$, as described in Proceedings of the Sixth National Conference on Particle Accelerators, vol. 2, 1979, Dubna, Rezvykh K. A., Romanov V. A., Calculation of Static Field of High- Voltage Complex-Shaped Structures, pp. 116–119 (in Russian).

Figure 9:
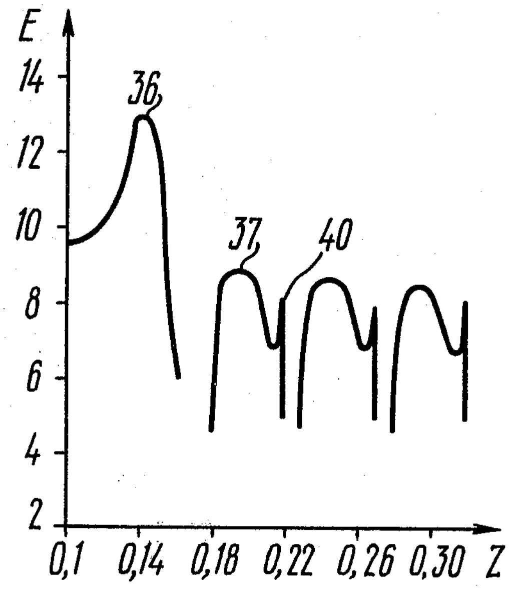
FIG. 9 shows distribution of the electrostatic field strength along the outside surface of the high-voltage terminal of an accelerator and supporting column of FIG. 2.

For better understanding of the essence of the present invention FIG. 9 illustrates the distribution of the electrostatic field at the high-voltage terminal 10 (FIG. 2) and electrodes 20 expressed in $Mv/m^{-1}$, whose intensity E is plotted along the Y-axis. Plotted along the X-axis is the distance Z along the longitudinal axis of the column expressed in meters. This distribution is true for an accelerator supporting column described above with the same potential of 2.5 Mv, the potential gradient of 1.25 $Mv/m^{-1}$ and the same geometrical dimensions except for the profile of the electrodes 20 which is formed by joining two ovals a and b with the angles $\alpha$ and $\alpha_1$ equal to 15° and 25°, respectively.

The maximum intensity 36 (FIG. 9) of the electrostatic field at the terminal 10 is about 13 $Mv/m^{-1}$, whereas the maximum intensity 37 of the static field at the electrodes 20 of the column is equal to 9 $Mv/m^{-1}$.

The field intensity peaks which existed at the electrodes having round profiles are substantially lower owing to the fact that, according to the invention, the curved surface of the electrodes 20 (FIG. 2), facing the high potential end of the column, is located in the area where the longitudinal component of the field intensity is deducted from the lateral component. The strongly curved surface of the electrodes 20, directed towards the footing 12 of the column is located in the part of the field weakened by the adjoining electrode 20. In consequence, the supporting column has, according to the invention, greater electrical strength as compared to the high-voltage terminal 10 of the accelerator providing an opportunity to improve the reliability of the accelerator and, in some instances, to obtain a higher accelerator potential.

Columns of FIGS. 3–8 operate like the columns of FIGS. 1 and 2. Below are descriptions of differences characteristic of other embodiments of the column.

The supporting column of FIG. 3 has the terminal 10 shielding the high potential region 9 and the intermediate region 13 starting with the electrodes 21 having high electrical strength.

In the column of FIG. 4 the electrodes 23 possess high electrical strength laterally, since the vertex 14 of the oval b is surrounded by the electrodes of sections 1 and the field intensity at the vertex 15 of the oval a is limited due to lower potential at the electrodes 23 in the region 11.

In the supporting column of FIG. 5 the low potential region 11 possesses even higher electrical strength in comparison with the column of FIG. 4. Proceeding from the linear principle of potential division along the length of the column, the angular coefficient of the potential in the region 11 (FIG. 5) is the double or even treble of the angular coefficient in other regions 9 and 13 of the column. The total length of the supporting column can therefore be reduced without reducing the electrical strength thereof.

In the supporting column of FIG. 6 the intermediate region 13 has transitional zones including electrodes 28 and 29 which help to level off the intensity distribution at junctions of regions of the column.

In the supporting column of FIG. 7 the clearance between the electrodes 30, 31 and 32 and the grounded electrode (not shown) of the accelerator, wherein the column is placed, narrows along the length of the column as the potential decreases. The electrical crosswise strength of the electrodes 30, 31 and 32 is, consequently, uniformly high.

Figure 10:
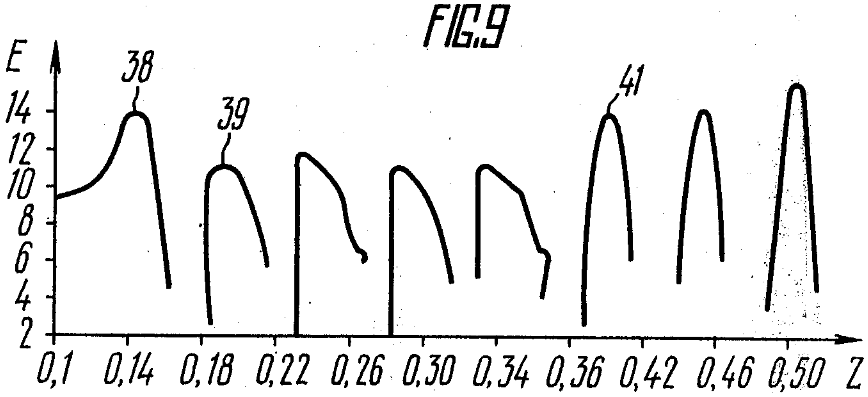
FIG. 10 shows distribution of electrostatic field strength along the outside surface of the high-voltage terminal of an accelerator and column of FIG. 8.

The high potential region 9 of the supporting column of FIG. 8 operates similarly to the region 9 of the column of FIG. 7, whereas the regions 11 and 13 operate similarly to that of the column of FIG. 1. For better understanding of the invention, however, FIG. 10 shows the distribution of the electrostatic field intensity E along the high-voltage terminal 10 of the accelerator and electrodes 30 and 4, which is similar to that of the column of FIG. 8. The same values are plotted along the axes of FIG. 10 as in FIG. 9.

The maximum 38 (FIG. 10) of the electrostatic field intensity at the terminal 10 amounts to about 13 $Mv/m^{-1}$. The maximum 39 of the electrostatic field intensity of the electrodes 30 is 11 $Mv/m^{-1}$ in contrast to the maximum 37 (FIG. 9) of the electrostatic field intensity of the electrodes 20 (FIG. 2), which is 9 $Mv/m^{-1}$.

But the column of FIG. 2 has a electrostatic field intensity peak 40 (FIG. 9) between the sections 1 of the column, which reduces the electrical strength thereof. The longitudinal electrical strength of the column can only be increased by either diminishing the angular coefficient of the linear principle of potential division in the high potential region 9 accompanied by respective increase of the angular coefficient in adjoining regions, or by making the profile of the electrodes 30 (FIG. 8), according to the invention, as a combination of three ovals c, d and e. Elimination of the peak 40 (FIG. 9) by making the profiles of the electrodes 30 (FIG. 8) in accordance with the invention is illustrated in FIG. 10.

Selection of angles $\alpha$ can be shown through comparison of distribution of intensities of the electrostatic field of FIGS. 9 and 10.

Angles $\alpha=15°$ and $\alpha_1=25°$ (FIG. 2) provide high electrical strength laterally but result in low electrical strength longitudinally. Angles $\alpha_6=20°$, $\alpha_7=30°$ and $\alpha_8=40°$ (FIG. 8) provide sufficiently high electrical strength of the column in both directions.

The fifth from the high-voltage terminal 10 (FIG. 8) electrode 4 of the accelerator is round in profile and the first electrode of the intermediate region 13. The maximum 41 (FIG. 10) of the electrostatic field intensity of this electrode 4 amounts to 14 $Mv/m^{-1}$. In this embodiment of the supporting column sufficiently high electrical crosswise strength of said column is guaranteed if the number of sections 1 in the high potential region 9 is from ten to fifteen. Thus, for example, with ten sections 1 the intensity peak reaches 12 $Mv/m^{-1}$ and with fifteen sections 1 it is from 1 to 10 $Mv/m^{-1}$.

The field intensity peak 41 at junctions of regions can be levelled off by providing transitory zones, as described above.

The supporting column of FIG. 8 increases, according to the invention, the lateral and longitudinal electrical strength thereof by itself.

In conclusion, it should be noted that the reliability of a supporting column and, in some instances, the operating potential thereof can only be increased, according to the invention, by altering the shape of electrodes. With constant operating potential the reduction of the lateral size of the grounded electrode of the accelerator or of the working pressure of the insulating gaseous mixture is about 30 percent. Operating costs can also be cut down by using a cheaper insulating mixture.

Shorter column is, according to the invention, more rigid and facilitates transport of charged particles.

However, with minimum length of the column the electrical lateral strength deteriorates.

Combinations of electrodes having different profiles permits more uniform exploitation of the insulating properties of the insulating medium, each region of the column performing its own function. Namely: the high potential region warrants lateral electrical strength and reliability of accelerator operation, the low potential region of a high longitudinal electrical strength makes the column shorter, uncomplicated profiles of electrodes in the region make the column less expensive, whereas the transitory zones between said regions warrant sufficient electrical strength provided the length of regions is brought to optimum.

The proposed supporting column permits, according to the invention, fast and easy updating of existing supporting columns.

In the description of the preferred embodiments of the invention specific narrow terminology is resorted to for clarity. However, the invention is in no way limited to the terminology thus adopted and it should be remembered that each such term is used to denote all equivalent elements functioning in an analogous way and employed for similar purposes.

While a preferred embodiment has been shown and described, various modifications and variants may be made without deviating from the scope and spirit of this invention, easily understandable for those skilled in the art.

These modifications and variants do not constitute departures from the spirit and scope of the invention as set forth in the appended claims.

What is claimed is:

1. A supporting insulating column of a high-voltage accelerator having a high-voltage terminal, comprising:

a grounded footing;

a multitude of sections having operating potential distributed among said sections, said sections forming a high potential region adjoining said high-voltage terminal, a low potential region adjoining said grounded footing and an intermediate region;

said sections comprising exterior screening electrodes made as hoops whose outer surface produces the external surface of said sections, interior electrodes whereon said exterior electrodes are secured and frames whereon said interior electrodes are secured;

components of a voltage divider, arranged on said frames of said adjoining sections;

insulators separating said sections from one another;

at least some of said exterior electrodes, made as said hoops, having an oval profile in at least one of said regions oriented so that one vertex of the oval of said oval profile is directed inside the column, whereas the other vertex is directed away from the column, and the major axis of said oval extending therethrough forms with a tangent to said outer surface an angle read from the high protential end of the column;

said oval profile of at least some electrodes in at least one off said regions, formed by joining components at least two ovals so that said angle read from the high potential end of the column is produced between the major axis of the oval of one said component and the tangent to said outer surface of said sections, and another angle is obtained between the extension of the major axis running through the vertex of the oval of another said component, directed inside the column, and the same tangent to said outer surface of said sections, which is larger than the angle read from the high potential end of the column and is also read from said high potential end of the supporting column.

* * * * *